July 5, 1927.

J. D. ORLOWSKI 1,634,883

WINDOW SEAT

Filed April 10, 1926

Witnesses:
C. E. Wessels.
B. J. Richards

Inventor:
John D. Orlowski,
By Joshua R. H. Potts.
his Attorney.

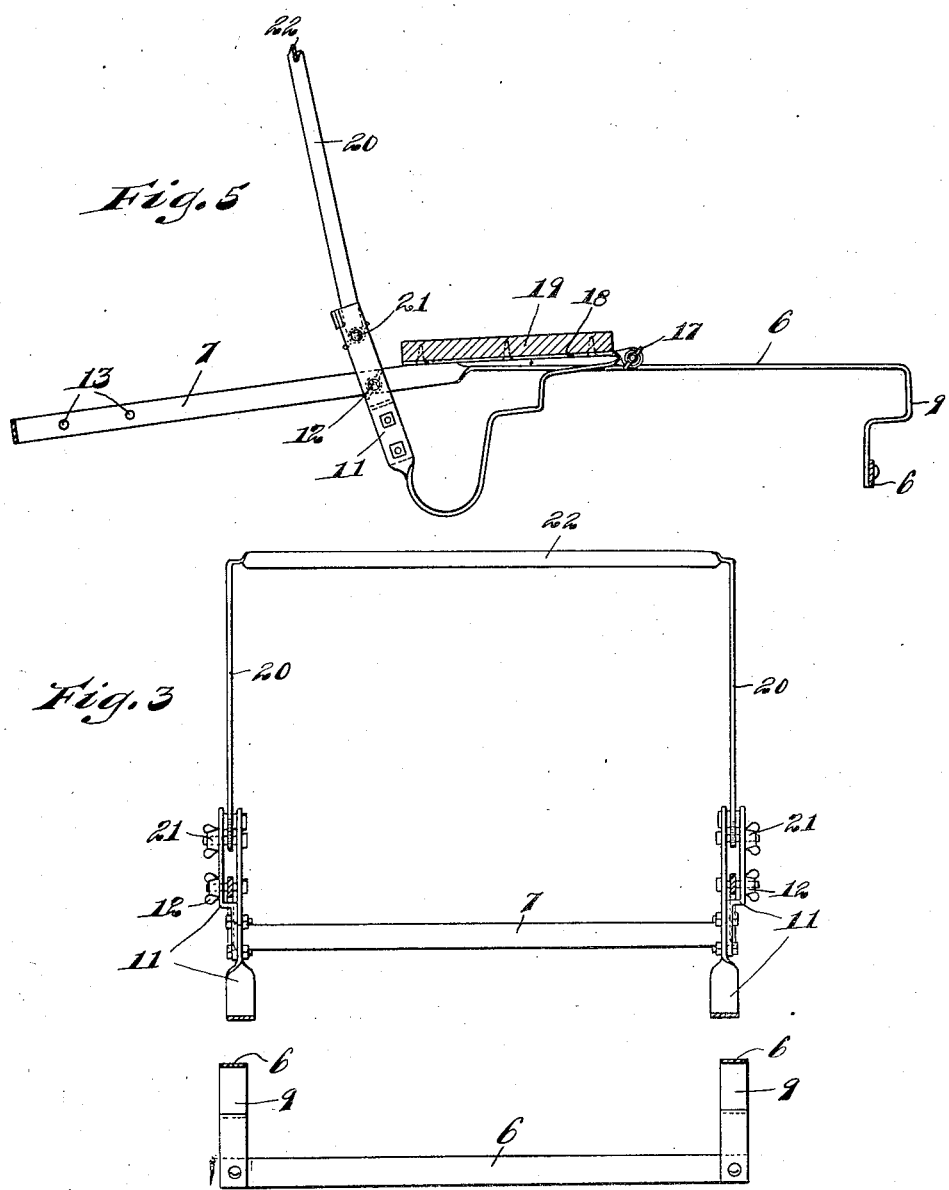

Patented July 5, 1927.

1,634,883

UNITED STATES PATENT OFFICE.

JOHN D. ORLOWSKI, OF CHICAGO, ILLINOIS.

WINDOW SEAT.

Application filed April 10, 1926. Serial No. 101,037.

My invention relates to improvements in window seats and has for its object the provision of an improved construction of this character arranged and adapted to be readily attached to any ordinary window sill to facilitate washing the windows and which is capable of economical manufacture and is highly efficient in use.

Other objects will appear hereinafter.

The invention consists in the combinations and arrangements of parts hereinafter described and claimed.

The invention will be best understood by reference to the accompanying drawings forming a part of this specification, and in which, Fig. 1 is a top plan view of a window seat embodying the invention;

Fig. 3 is a section taken on the line 3—3 of Fig. 2;

Fig. 4 is a section taken on the line 4—4 of Fig. 1; and

Fig. 5 is a vertical section of a slightly modified form of construction.

Figure 1:
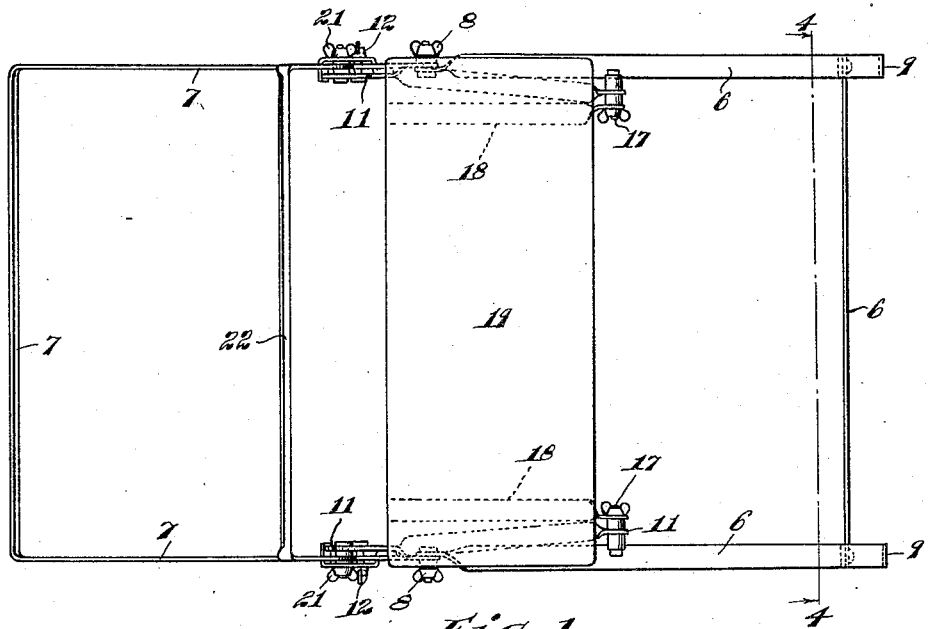
Figure 2:
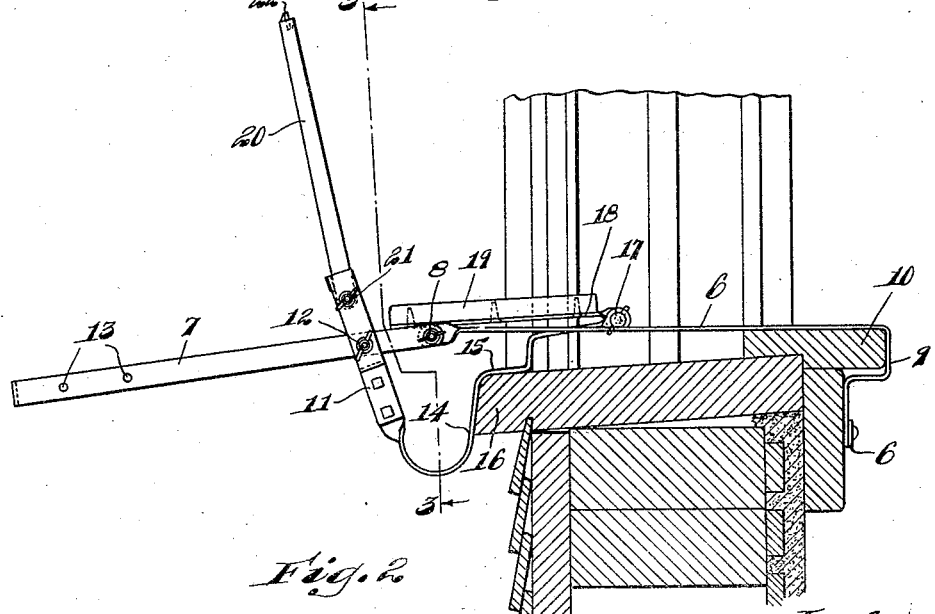
Fig. 2 is a vertical section through a window sill showing the seat in position of use.

The preferred form of construction comprises a substantially rectangular main frame made up of an inner part 6 and an outer part 7 constructed as shown of steel strips bent and arranged to form the respective ends of a rectangular frame said frame portions being adjustably secured together by means of hinge bolts 8 whereby the angularity between said frame sections may be readily adjusted to suit different window sills. The frame section 6 is provided with hook elements 9 arranged and adapted to engage over the inner ledge 10 of an ordinary window sill with said main frame projecting outwardly through the window and resting on the window sill as shown in Fig. 2. A seat frame 11 is pivotally connected by means of the bolts 12 with the sides of the frame section 7, said frame section 7 being provided with a plurality of sets of bolt holes 13 by means of which the position of the seat frame may be adjusted on the main frame to suit different widths of window sills. The seat frame 11 is extended below said main frame and bent to form a stop 14 and a supporting shoulder 15 to rest over the outer ledge 16 of the window sill as shown in Fig. 2 and whereby said main frame and seat frame will be securely supported and clamped to said window sill. The sides of said seat frame are then extended upwardly within and through the main frame and pivotally connected by means of bolts 17 with brackets 18 on the underside of a seat board 19, said seat board 19 being extended laterally as shown to rest upon the sides of the main frame. The sides of the seat frame 11 are also extended above the main frame and a back rest 20 is pivotally connected by means of bolts 21 with the upper portions of said seat frame. The said back rest consists of a strip of steel bent into substantially U shape as shown and having the central portion 22 twisted relatively to the side portions as shown to constitute a flat rest for the back of the person seated upon the seat board 19.

By this arrangement it will be noted that the seat may be readily adjusted to any ordinary window sill and securely clamped thereto so as to support the weight of a person washing the window on the outside, the back rest 20—22 supporting the back of the window washer and also preventing falling from said seat. By means of the holes 13 the seat frame may be adjusted to accommodate various sizes of window sills and the main frame can be adjusted angularly to suit different shapes of window sills. It will be observed that the weight of the window washer will be supported substantially directly upon the supporting shoulder 15 on the outer ledge of the window sill and thus a firm and secure support afforded. Obviously with a person seated upon the seat board 19 the device will be securely clamped to the window sill and disengagement positively prevented.

In Fig. 5 I have illustrated a slightly modified form of construction in which the inner and outer portions of the main frame are formed integrally with each other and are therefore not adjustable. Otherwise the construction is the same as that already described.

While I have illustrated and described the preferred form of construction for carrying my invention into effect, it is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A device of the class described comprising a main frame provided at its inner end with hook elements to engage the inner ledge of a window sill; a seat frame pivotally mounted on said main frame and arranged to rest on the outer ledge of said window sill; and a seat on said seat frame, substantially as described.

2. A device of the class described comprising a main frame provided at its inner end with hook elements to engage the inner ledge of a window sill; a separate seat frame pivotally mounted on said main frame and extending below the same to rest on the outer ledge of said window sill, said seat frame also extending above said main frame to constitute a back rest; and a seat on said seat frame, substantially as described.

3. A device of the class described comprising a main frame provided at its inner end with hook elements to engage the inner ledge of a window sill; a seat frame on said main frame and arranged to rest on the outer ledge of said window sill; and a seat on said seat frame and resting on said main frame, substantially as described.

4. A device of the class described comprising a main frame provided at its inner end with hook elements to engage the inner ledge of a window sill; a seat frame pivotally mounted on said main frame and extending below the same to rest on the outer ledge of said window sill, said seat frame also extending above said main frame to constitute a back rest; and a seat on said seat frame and resting on said main frame, substantially as described.

5. A device of the class described comprising a main frame in substantially rectangular form and composed of strips constituting an inner and an outer frame portion, said frame portions being hingedly connected together to permit angular adjustments relatively to each other; hook elements on the inner frame portion arranged to engage the inner ledge of a window sill, said main frame projecting thence through the window over the sill thereof; a seat frame pivotally and adjustably mounted on the outer portion of said main frame, said seat frame extending below said main frame and provided with a shoulder adapted and arranged to rest upon the outer edge of a window sill, said seat frame also extending above said main frame to constitute a back rest; and a seat mounted on said seat frame, substantially as described.

6. A device of the class described comprising a main frame in substantially rectangular form and composed of strips constituting an inner and an outer frame portion, said frame portions being hingedly connected together to permit angular adjustments relatively to each other; hook elements on the inner frame portion arranged to engage the inner ledge of a window sill, said main frame projecting thence through the window over the sill thereof; a seat frame pivotally and adjustably mounted on the outer portion of said main frame, said seat frame extending below said main frame and provided with a shoulder adapted and arranged to rest upon the outer edge of a window sill, said seat frame also extending above said main frame to constitute a back rest; and a seat secured at the inner edge to said seat frame the outer edge supported by said main frame, substantially as described.

7. In a device of the class described the combination of a main frame in substantially rectangular form and composed of strips constituting an inner and an outer frame portion, said frame portions being hingedly connected together to permit angular adjustments relatively to each other; hook elements on the inner frame portion arranged to engage the inner ledge of a window sill, said main frame projecting thence through the window over the sill thereof; a seat frame pivotally and adjustably mounted on the outer portion of said main frame, said seat frame extending below said main frame and provided with a shoulder adapted and arranged to rest upon the outer edge of a window sill, said seat frame also extending above said main frame to constitute a back rest; with a seat pivotally mounted on said seat frame and extended at its ends to rest upon said main frame, substantially as described.

In testimony whereof I have signed my name to this specification.

JOHN D. ORLOWSKI.